(12) United States Patent
Alon

(10) Patent No.: US 10,069,622 B2
(45) Date of Patent: *Sep. 4, 2018

(54) CRYPTOGRAPHIC OPERATION BY APPLYING SUB-KEYS TO MULTIPLICATION UNITS IN ACCORDANCE WITH GALOIS-FIELD ARITHMETIC

(71) Applicant: Nuvoton Technology Corporation, Hsin-chu (TW)

(72) Inventor: Moshe Alon, Tel-Aviv (IL)

(73) Assignee: NUVOTON TECHNOLOGY CORPORATION, Hsin-Chu (TW)

(*) Notice: Subject to any disclaimer, the term of this patent is extended or adjusted under 35 U.S.C. 154(b) by 50 days.

This patent is subject to a terminal disclaimer.

(21) Appl. No.: 15/298,250

(22) Filed: Oct. 20, 2016

(65) Prior Publication Data

US 2017/0302436 A1 Oct. 19, 2017

Related U.S. Application Data

(63) Continuation of application No. 14/493,382, filed on Sep. 23, 2014, now Pat. No. 9,525,546.

(30) Foreign Application Priority Data

Mar. 17, 2014 (IL) .......................................... 231550

(51) Int. Cl.
*H04L 9/08* (2006.01)
*H04L 9/06* (2006.01)
*G09C 1/00* (2006.01)

(52) U.S. Cl.
CPC .............. *H04L 9/0618* (2013.01); *G09C 1/00* (2013.01); *H04L 9/065* (2013.01); *H04L 2209/72* (2013.01)

(58) Field of Classification Search
CPC ...... H04L 9/0637; H04L 2209/24; H04L 9/14
USPC ......................... 380/28–30, 41, 42
See application file for complete search history.

(56) References Cited

U.S. PATENT DOCUMENTS

| | | | | |
|---|---|---|---|---|
| 2004/0047466 A1* | 3/2004 | Feldman | ............... | H04L 9/0631 380/37 |
| 2004/0202318 A1* | 10/2004 | Lu | .......... | H04L 9/0631 380/29 |
| 2005/0265546 A1* | 12/2005 | Suzuki | .................. | H04L 9/0662 380/44 |
| 2007/0098153 A1* | 5/2007 | Nishikawa | ............ | H04L 9/0631 380/30 |
| 2008/0232581 A1* | 9/2008 | Elbaz | ...................... | H04L 9/065 380/42 |
| 2009/0214024 A1* | 8/2009 | Schneider | ............. | H04L 9/0625 380/28 |

(Continued)

*Primary Examiner* — Haresh N Patel
(74) *Attorney, Agent, or Firm* — D. Kligler IP Services Ltd.

(57) ABSTRACT

A cryptography apparatus includes multiple multiplication units and logic circuitry. The multiplication units are arranged in two or more multiplication levels, and are configured to operate in accordance with Galois-Field (GF) arithmetic over respective Galois fields. The logic circuitry is configured to receive input data whose word-size exceeds a maximal input word-size among the multiplication units, to hold a cryptographic key including multiple sub-keys whose number does not exceed a number of the multiplication units, and to perform a cryptographic operation on the input data by applying the sub-keys to the multiplication units.

25 Claims, 6 Drawing Sheets

(56) References Cited

U.S. PATENT DOCUMENTS

| | | | | |
|---|---|---|---|---|
| 2010/0057823 A1* | 3/2010 | Filseth | .................. | H04L 9/0631 |
| | | | | 708/492 |
| 2011/0255689 A1* | 10/2011 | Bolotov | ................ | H04L 9/0631 |
| | | | | 380/42 |
| 2013/0301827 A1* | 11/2013 | Mueller | ................ | H04L 9/0643 |
| | | | | 380/28 |
| 2015/0058595 A1* | 2/2015 | Gura | ................... | G06F 12/1018 |
| | | | | 711/206 |

* cited by examiner

CRYPTOGRAPHIC OPERATION BY APPLYING SUB-KEYS TO MULTIPLICATION UNITS IN ACCORDANCE WITH GALOIS-FIELD ARITHMETIC

CROSS-REFERENCE TO RELATED APPLICATIONS

This application is a continuation of U.S. patent application Ser. No. 14/493,382, filed Sep. 23, 2014, which claims priority from Israel Patent Application 231550, filed Mar. 17, 2014, The disclosures of these related applications are incorporated herein by reference.

FIELD OF THE INVENTION

The present invention relates generally to data encryption, and particularly to methods and systems for secure storage on external memory.

BACKGROUND OF THE INVENTION

Some cryptographic operations such as encryption and decryption are based on Galois-Field (GF) arithmetic. Various implementations of Galois-Field arithmetic are known in the art. For example, in U.S. Pat. No. 4,322,577, whose disclosure is incorporated herein by reference, encryption and decryption of information of a message are performed by partitioning a plain text message into blocks of binary digits and by further partitioning the blocks into sub-blocks which are interpreted as elements in a Galois field. A plain text matrix (M) of the elements is multiplied by a first key matrix (A) of a group over the Galois field, the resulting product (M·A) being multiplied by a second key matrix (B) of the same group over the Galois field. The final product (B·M·A) thus received constitutes the encrypted message block (K). Decryption is performed by multiplying the transmitted product (B·M·A) by inverse key matrices ($A^{-1}$, $B^{-1}$) generated by the same keys (a, b) as used for decryption and taken in the proper order.

U.S. Pat. No. 4,975,867, whose disclosure is incorporated herein by reference, describes an apparatus and/or method which enables one to divide two elements, A and B, of $GF(2^{2M})$, i.e., perform the operation B/A, by finding the multiplicative inverse of the divisor A, and then multiplying the inverse by the numerator, B. The multiplicative inverse, $A^{-1}$, of A is found by computing a conversion factor, D, and then multiplying A by D to convert it to an element C, where C is also an element of a smaller Galois field, $GF(2^M)$, which is a subfield of $GF(2^{2M})$. Specifically, C is equal to $A^{2M+1}$, or $A^{2M} \cdot A$, in the field $GF(2^{2M})$. Next, the multiplicative inverse, $C^{-1}$, of C in $GF(2^M)$ is found by appropriately entering a stored look-up table containing the $2^M$ elements of $GF(2^M)$. The multiplicative inverse, $C^{-1}$, of C is thereafter converted, by multiplying it by the conversion factor D calculated above, to the element of $GF(2^{2M})$ which is the multiplicative inverse, $A^{-1}$, of the original divisor, A. The multiplicative inverse, $A^{-1}$, of A is then multiplied by B to calculate the quotient, B/A.

U.S. Pat. No. 6,766,345, whose disclosure is incorporated herein by reference, describes a Galois-Field multiplier system that includes a multiplier circuit for multiplying two polynomials with coefficients over a Galois field to obtain their product, a Galois-Field linear transformer circuit responsive to the multiplier circuit for predicting the modulo remainder of the polynomial product for an irreducible polynomial, and a storage circuit for supplying to the Galois-Field linear transformer circuit a set of coefficients for predicting the modulo remainder for predetermined irreducible polynomial.

In "GF(2K) multipliers based on Montgomery multiplication algorithm," Proceedings of the 2004 IEEE International Symposium on Circuits and Systems (ISCAS 2004), May 23-26, 2004, Vancouver, Canada, whose disclosure is incorporated herein by reference, Fournaris et al. describe two Finite-Field multiplier architectures and VLSI implementations that use the Montgomery Multiplication Algorithm. The first architecture (Folded) is optimized in order to minimize the silicon covered area (gate count) and the second (Pipelined) is optimized in order to reduce the multiplication time delay. Both architectures are measured in terms of gate count-chip covered area and multiplication time delay and have more than adequate results in comparison with other known multipliers.

SUMMARY OF THE INVENTION

An embodiment of the present invention provides a cryptography apparatus including multiple multiplication units and logic circuitry. The multiplication units are arranged in two or more multiplication levels, and are configured to operate in accordance with Galois-Field (GF) arithmetic over respective Galois fields. The logic circuitry is configured to receive input data whose word-size exceeds a maximal input word-size among the multiplication units, to hold a cryptographic key including multiple sub-keys whose number does not exceed a number of the multiplication units, and to perform a cryptographic operation on the input data by applying the sub-keys to the multiplication units.

In some embodiments, the input data includes plain text data, the cryptographic key includes an encryption key, and the cryptographic operation includes an encryption operation applied to the plain text data. In other embodiments, the input data includes cipher text data, the cryptographic key includes a decryption key, and the cryptographic operation includes a decryption operation applied to the cipher text data.

In an embodiment, the logic circuitry is configured to alternate between first and second modes of using the multiplication units, such that in the first mode, the input data includes plain text data, the cryptographic key includes an encryption key, and the cryptographic operation includes an encryption operation applied to the plain text data, and, in the second mode, the input data includes cipher text data, the cryptographic key includes a decryption key, and the cryptographic operation includes a decryption operation applied to the cipher text data.

In some embodiments, the multiple sub-keys include multiple decryption sub-keys, and the logic circuitry is configured to derive the decryption sub-keys from an encryption key that was used for producing the cipher text data. In other embodiments, the encryption key includes multiple encryption sub-keys, and the logic circuitry is configured to derive each of the multiple decryption sub-keys by applying an inversion operation to each respective encryption sub-key. In yet other embodiments, the logic circuitry is configured to feed inputs to the multiplication units in a given multiplication level by manipulating the input data or the outputs of the multiplication units of a previous multiplication level by performing at least one operation selected from a group of operations consisting of bit-splitting, bit-combining, and bit mixing.

In an embodiment, the logic circuitry is configured to manipulate the outputs of the multiplication units during decryption operations in reverse order with respect to an order used during encryption operations. In another embodiment, the input data includes plain text or cipher text data, the cryptographic key includes an authentication key, and the cryptographic operation includes an authentication operation applied to the plain text or to the cipher text data.

In some embodiments, the logic circuitry is configured to authenticate the cipher text data by comparing between a first signature calculated from first data that is derived from the cipher text during decryption, and a second signature calculated from second data that is derived from the plain text during encryption, and if the first and second signatures are equal to one another, then the cipher text is considered authentic with high probability. In other embodiments, the logic circuitry is configured to calculate the signature by processing the first and second data, and the authentication key, using a multiplication unit. In yet other embodiments, the plain text data includes input text and input authentication data, the cipher text data includes output text and output authentication data, and the logic circuitry is configured to authenticate the cipher text data by comparing the input and output authentication data.

There is additionally provided, in accordance with an embodiment of the present invention, a method for cryptography including receiving input data whose word-size exceeds a maximal input word-size among multiple multiplication units, which are arranged in two or more multiplication levels, and which are configured to operate in accordance with Galois-Field (GF) arithmetic over respective Galois fields. A cryptographic key, including multiple sub-keys whose number does not exceed a number of the multiplication units, is held. A cryptographic operation is performed on the input data by applying the sub-keys to the multiplication units.

There is additionally provided, in accordance with an embodiment of the present invention, a computing system including an external memory and a controller. The controller includes multiple multiplication units, which are arranged in two or more multiplication levels, and which are configured to operate in accordance with Galois-Field (GF) arithmetic over respective Galois fields, and is configured to receive input data whose word-size exceeds a maximal input word-size among the multiplication units, to hold a cryptographic key including multiple sub-keys whose number does not exceed a number of the multiplication units, and to perform a cryptographic operation on the input data by applying the sub-keys to the multiplication units.

The present invention will be more fully understood from the following detailed description of the embodiments thereof, taken together with the drawings in which:

DETAILED DESCRIPTION OF EMBODIMENTS

Overview

Figure 1:
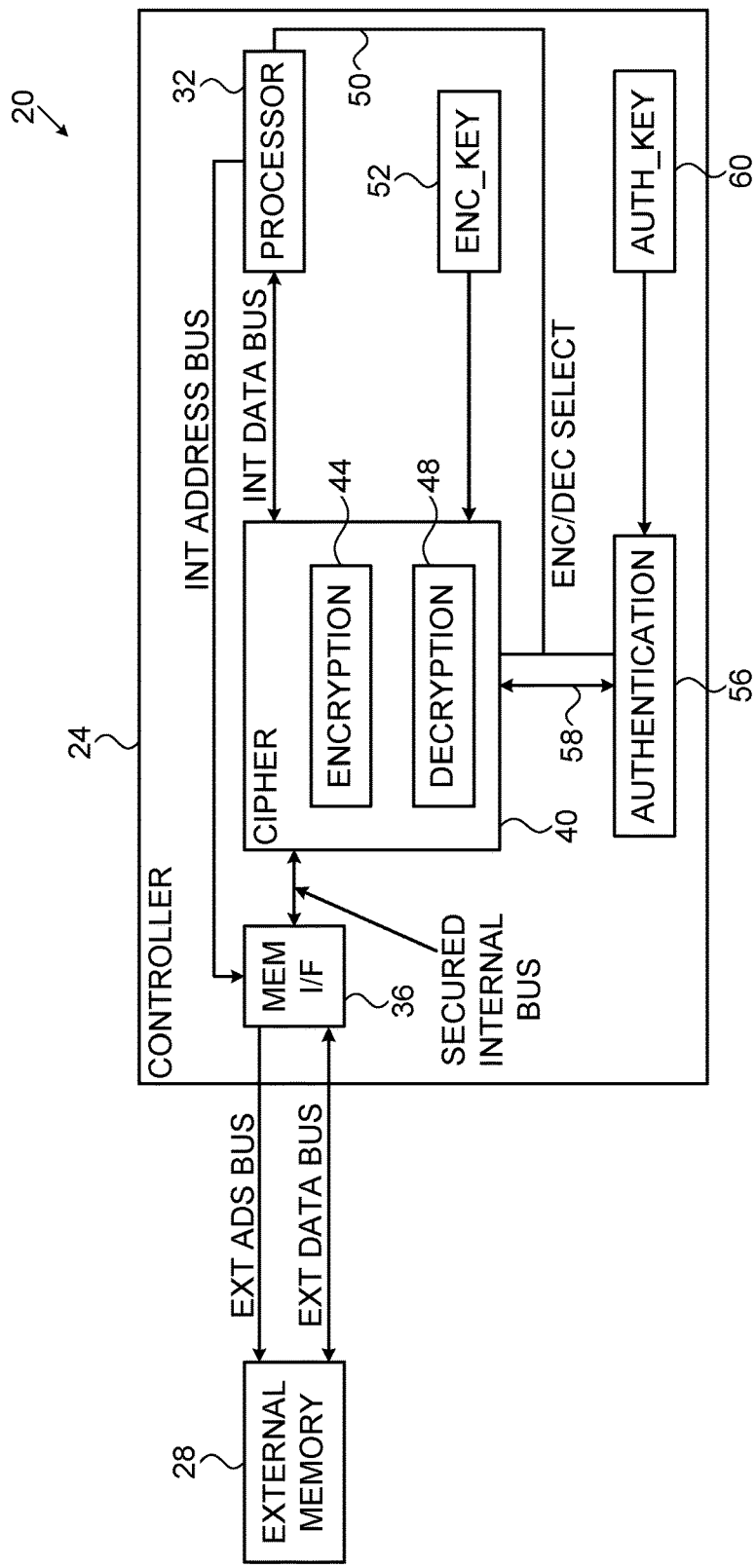
FIG. 1 is a block diagram that schematically illustrates a secured computing system, in accordance with an embodiment of the present invention.

In some secured computing systems, a controller stores encrypted code and/or data on an external memory. In some cases the controller comprises means for performing cryptographic operations securely, i.e., without exposing any secret information, but communicates with the external memory over a bus that may be vulnerable to various cryptographic attacks.

When writing or reading encrypted information to or from the external memory, it is desirable that the overhead created by the respective ciphering operations will be as small as possible. In principle, the controller may employ a stream cipher for performing low-latency encryption and decryption. Since, however, stream ciphers typically perform bit-wise XOR with some random key, they may be vulnerable to single-bit attacks. For example, an attacker may change bits in an address pointer to gain access to confidential information and/or to disrupt the operation of the controller.

As another example, the controller may use a block cipher whose encryption operation is based on Galois-Field (GF) multiplication. In the description that follows and in the claims, the input data to the cipher is referred to as "plain text" when performing encryption, and "cipher text" when performing decryption. The input data or derivatives thereof, which are subject to GF multiplication, are regarded as elements of the GF in use.

In the encryption direction, the cipher multiplies the input data by a secret key to produce the encrypted data. In the decryption direction, the input data can be recovered by multiplying the encrypted data by a key, which equals the multiplicative inverse (i.e., in GF arithmetic) of the key used for encryption. Deriving the inverse key, however, involves complex calculations that may increase the latency of memory read operations significantly, or may require the use of large inversion tables. For example, the size of a 16-bit key inversion table is on the order of 1 Megabits.

Embodiments of the present invention that are described herein provide improved methods and systems for performing cryptographic operations which are based on Galois-Field multiplication. In the disclosed techniques, a cipher comprises multiple multiplication units and logic circuitry that implements the interconnections among the multiplication units and manages data flow within the cipher. In some embodiments the cipher operates in two modes, i.e., encryption or decryption, while differently interconnecting the same multiplication units.

Each GF multiplier within the multiplication units multiplies a sub-word derived from the plain or cipher text (or from another GF multiplication unit) by a respective sub-key that is derived from a larger secret key. Calculating sub-keys for decryption is significantly less complex than calculating the larger decryption key. In the description that follows and in the claims, a multiplication unit may comprise a GF multiplier, or a multiplication engine comprising multiple GF multipliers.

In some embodiments, each of the plain and cipher texts comprises 16 bits. The logic circuitry splits a 32-bit encryption key into four 8-bit sub-keys, which are input to four respective GF multipliers. Each multiplier performs GF multiplication of an 8-bit input by one of the 8-bit sub-keys to produce an 8-bit product. In the encryption direction, the logic circuitry splits the plain text into two 8-bit sub-words, which are input to two respective GF multipliers.

The logic circuitry re-arranges the 8-bit outputs of these GF multipliers into two 8-bit sub-words, which are each input to the other two multipliers, whose 8-bit outputs are combined to produce the 16-bit cipher text. In the decryption direction, the logic reverses the operations carried out during encryption, by replacing bit-splitting with respective bit-combining operations and vice versa. Additionally, for decryption, the logic circuitry derives decryption sub-keys by calculating the multiplicative inverse for each respective encryption sub-key using only a 256·8 bit=2 Kbit inversion table.

In some embodiments, the logic circuitry applies an additional stream ciphering operation to the 16-bit encrypted data, to avoid outputting a zero cipher text when the plain text equals zero. The logic circuitry reverses this stream ciphering operation during decryption.

In another embodiment, the complete cipher described above (i.e., supporting 16-bit plain/cipher text and a 32-bit secret key) serves as a multiplication engine in a cipher that performs encryption and decryption of respective 32-bit plain and cipher texts using a 128-bit secret key. In this embodiment, the general architecture and data flow of the cipher are similar to those of the former cipher, with suitable modifications to input, output and intermediate bit-sizes. The logic circuitry splits the 128-bit encryption key into four 32-bit sub-keys, which are further split into four 8-bit sub-keys (i.e., a total of sixteen 8-bit encryption sub-keys) and inputs each of the four 32-bit sub-keys to a respective multiplication engine. In the decryption direction, the logic circuitry uses sixteen 2 Kbit tables to derive sixteen multiplicative inverse sub-keys, of which four are input to each respective multiplication engine.

In general, longer encryption key typically achieves stronger security, but requires higher computational resources to generate. In some embodiments, instead of generating a 128-bit key, the cipher generates only a single 32-bit key to be used by all the GF multiplication engines. Alternatively, the cipher can generate a 64-bit key, split the key into two 32-bit sub-keys, and input each 32-bit sub-key to two GF multiplication engines.

In some embodiments, the cipher reuses one or more of the tables used for calculating the inverse sub-keys. Reuse of the inversion tables is implementation dependent, and can be employed, for example, when the output of one multiplication unit is pipelined before input to other multiplication units.

In some embodiments, the controller authenticates the information it reads from the external memory, by storing along with the data a respective authentication signature, and verifying the validity of the signature and data upon reading the stored data back. In an embodiment, the controller comprises an authentication unit that calculates digital signatures using a 16-bit data and 128-bit key multiplication engine, for example, as described above. In the present example, the authentication unit operates in conjunction with the 32-bit/128-bit key cipher described above.

During encryption and decryption, the authentication unit accepts as input a 32-bit word of intermediate results from the cipher. When reading from the external memory data that is authentic (i.e., data that is not tampered with), the 32-bit value of intermediate results during encryption and decryption are equal and therefore result in matching respective signatures.

In some embodiments, the logic circuitry converts the 32-bit intermediate result into a 16-bit word input to the multiplication engine (e.g., by applying logical XORs to the 32-bit inputs ordered in bit-pairs). The multiplication engine processes the 16-bit input using the 32-bit key, and outputs a 16-bit product signature. In the encryption direction the signature is stored along with the encrypted data, whereas in the decryption direction the calculated signature is verified to match the read signature.

In some embodiments the logic circuitry combines the operations of ciphering and authentication by encrypting plain text that includes both input data to be encrypted and dedicated authentication data. In the decryption direction, the logic circuitry reads and decrypts the stored encrypted data to recover the input and the authentication data. The logic circuitry compares between the recovered authentication data and the authentication data that was used in the encryption direction, to validate that the recovered input data is authentic.

In the description that follows and in the claims, each of the encryption, decryption, and authentication operations is referred to as a "ciphering operation" or "cryptographic operation." Additionally, the respective secret key applied while performing a given ciphering or cryptographic operation is referred to as a "ciphering key" or "cryptographic key."

In the disclosed techniques, the encryption key is divided into multiple shorter sub-keys, whose multiplicative inverse can be derived using a small inversion table. Encrypting a given plain text or decrypting the respective cipher text can be performed using the same set of GF multipliers, or multiplication engines, whose number possibly equals the number of sub-keys. As a result, implementing the cipher requires only a small hardware footprint, while achieving similar cryptographic strength, compared to using GF multiplication with the full length key. Moreover, the disclosed ciphers do not suffer vulnerability weaknesses as attributed to stream ciphers.

System Description

FIG. 1 is a block diagram that schematically illustrates a secured computing system 20, in accordance with an embodiment of the present invention. System 20 comprises a controller 24 and an external memory 28. System 20 may be part of, for example, a personal computer, a server, a communication device such as a smartphone, or any other suitable type of computing system.

Controller 24 comprises a processor 32, which is configured to execute code that is stored encrypted in external memory 28. Controller 24 may alternatively or additionally store encrypted data and/or authentication signatures in external memory 28. The controller communicates with the external memory over an external bus using a memory interface 36. Memory interface 36 transforms between internal data and address information and respective signals suitable for communication over the external bus.

External memory 28 may comprise any suitable memory such as a Random Access Memory (RAM) or a non-volatile memory such as Flash memory. Other memory examples include Read Only Memory (ROM), Hard Disk Drive (HDD), Solid State Drive (SSD), and optical storage.

Controller 24 further comprises a cipher module 40, which comprises an encryption unit 44 and a decryption unit 48. Processor 32 configures cipher 40 to perform encryption or decryption using an encryption/decryption select line 50. Cipher 40 may comprise any suitable encryption and decryption units, such as stream or block ciphers of any suitable block size. In the embodiments described below, the encryption and decryption operations are based on Galois-Field arithmetic. Encryption unit 44 and decryption unit 48 may be implemented as separate units, or as a unified module that supports both directions.

Controller 24 holds a secret key 52 to be used in encryption, decryption, or in both directions. In some embodiments, secret key 52 comprises a static key. Alternatively, controller 24 generates secret key 52 on the fly. For example, when respective encryption and decryption units 44 and 48 comprise stream ciphers, secret key 52 may comprise a random stream key. As another example, when units 44 and 48 comprise block ciphers, secret key 52 may comprise a sequence of random keys, each applied to a respective input data block.

Note that when using random keys, the same key should be used for encrypting the data to be stored in a given memory address, and for decrypting the data when retrieved from the same memory address. Key randomization can be performed per each memory address or per multiple (e.g., consecutive) memory addresses.

In some embodiments, secret key 52 comprises an encryption key, from which cipher 40 derives the respective decryption key. For example, when the encryption is based on multiplication operations in some Galois field, the decryption key comprises the multiplicative inverse (in the same GF) of the encryption key. In the description that follows, the terms "encryption key" and "decryption key" refer to the respective encryption and decryption directions.

When writing data to external memory 28, processor 32 generates a respective memory address, and sends the data for storage to encryption unit 44, which encrypts the data by applying secret key 52. The controller sends the encrypted data for storage via interface 36. When reading encrypted data from external memory 28, controller 24 accepts the encrypted data from the external memory via memory interface 36. Decryption unit decrypts the accepted data using secret key 52, and delivers the decrypted data to processor 32.

In some embodiments controller 24 further comprises an authentication unit 56, which generates signatures by applying a secret authentication key 60. In the encrypt direction, authentication module 56 receives from cipher encrypted data over an authentication bus 58 and generates a respective signature using authentication key 60. The controller typically stores the signature linked to the encrypted data in external memory 28.

In the decrypt direction, authentication module 56 receives from cipher 40 encrypted data read from external memory 28, including the stored signature, over authentication bus 58. Authentication unit 56 generates a re-calculated signature of the read data using authentication key 60, and checks whether the re-calculated signature matches the stored signature. When the authentication verification fails, authentication unit 56 may signal a respective alert to cipher 40, which may accordingly avoid decrypting the read data. Alternatively, controller 24 may respond to authentication verification failure by taking any suitable actions.

Authentication unit 56 may use any suitable method for calculating signatures. In a disclosed embodiment, the calculation of the signatures is based on GF multiplication. The authentication key (or sub-keys derived thereof) is multiplied by intermediate data results during encryption or decryption and the multiplication results serve as the respective signatures.

Controller 24 may be implemented in hardware, e.g., using one or more Application-Specific Integrated Circuits (ASICs) or Field-Programmable Gate Arrays (FPGAs). Alternatively, the controller may comprise a microprocessor that runs suitable software, or a combination of hardware and software elements.

The configuration of FIG. 1 is an example system configuration, which is shown purely for the sake of conceptual clarity. System 20 may be configured to perform encryption or decryption with or without authentication. Alternatively, system 20 may be configured to perform data authentication without encryption/decryption.

Further alternatively or additionally, any other suitable secured storage system configuration can also be used. For example, although the example of FIG. 1 shows a single memory device, in alternative embodiments, controller 24 may connect to multiple memory devices 28. Elements that are not necessary for understanding the principles of the present invention, such as various interfaces, control circuits, addressing circuits, timing and sequencing circuits and debugging circuits, have been omitted from the figure for clarity.

In the example system configuration shown in FIG. 1, memory 28 and controller 24 are implemented as two separate Integrated Circuits (ICs). In alternative embodiments, however, the memory and the controller may be integrated on separate semiconductor dies in a single Multi-Chip Package (MCP) or System on Chip (SoC), and may be interconnected by an internal bus. Further alternatively, some or all of the controller circuitry may reside on the same die on which the memory is disposed. Further alternatively, some or all of the functionality of cipher 40 and/or authentication unit 56 can be implemented in software and carried out by a processor such as processor 32.

In some embodiments, processor 32 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Ciphering Based on Multiple GF Multiplications

In the description that follows, we assume that arithmetic operations are applied to the elements of a given Galois Field (GF) that may be generated using some underlying generating polynomial. Since the disclosed techniques apply to any valid generating polynomial, the details regarding the underlying generating polynomial are typically omitted. The term "multiplication" thus refers to multiplication between elements in the given GF, and the term "multiplicative inverse" of a given element refers to an element in the GF that, when multiplied by the given element (using GF arithmetic), results in the unity element defined in that GF.

Figure 2:
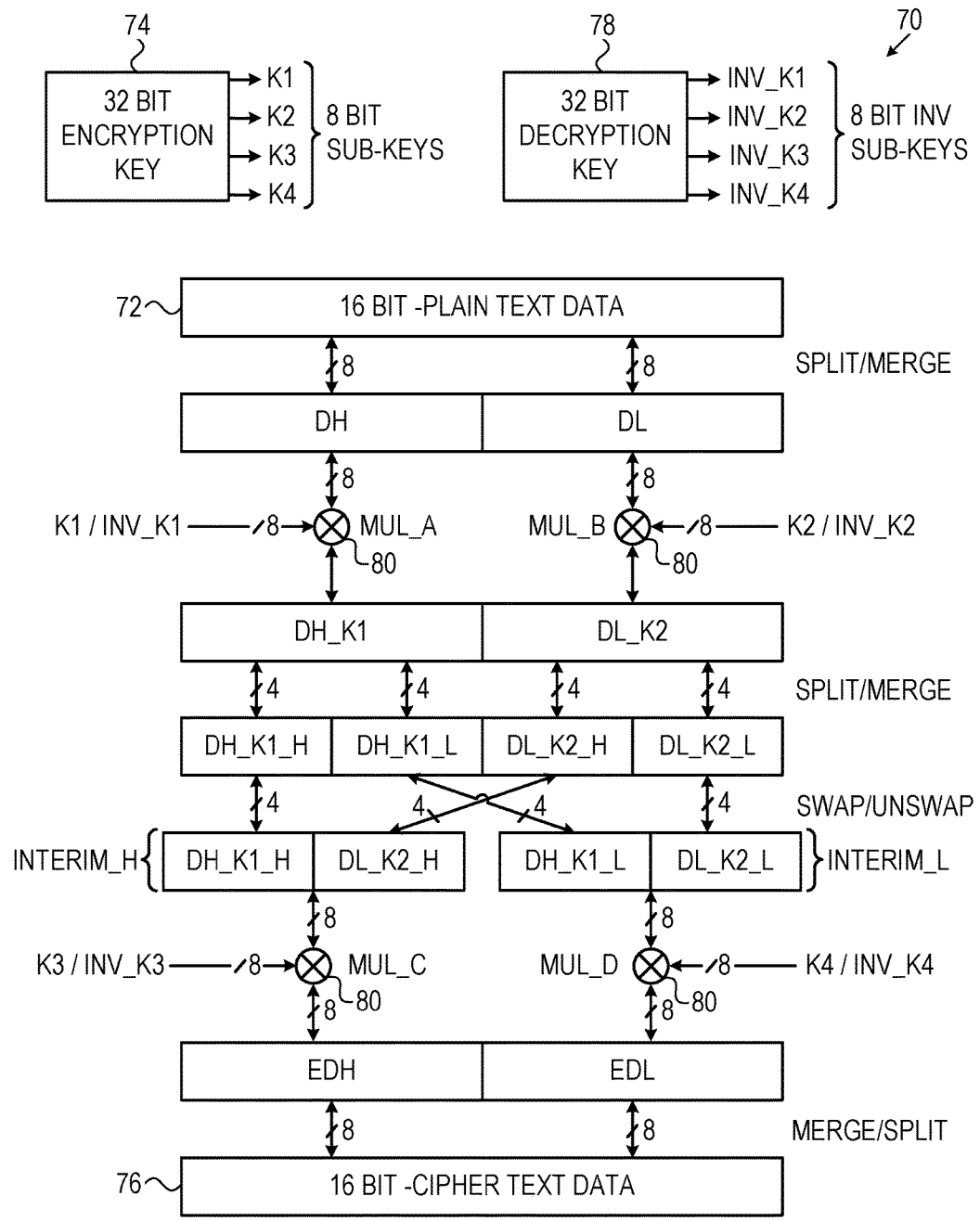
FIG. 2 is a diagram that schematically illustrates a cryptographic cipher that is based on Galois-Field multiplication, in accordance with an embodiment of the present invention.

FIG. 2 is a diagram that schematically illustrates a cipher 70 that is based on Galois-Field multiplications, in accordance with an embodiment of the present invention. The design principles of cipher 70 can be used to implement cipher 40 of FIG. 1 in hardware, as described further below in FIGS. 3 and 4. Cipher 70 can perform encryption as well as decryption operations.

In the example of FIG. 2, cipher 70 encrypts a 16-bit word of plain text 72 by applying a 32-bit encryption key 74, to produce a 16-bit word of cipher text 76. In the opposite direction, cipher 70 decrypts cipher text 76 using a 32-bit decryption key 78, to reproduce plain text 72.

Cipher 70 comprises four GF multipliers 80 denoted MUL_A, MUL_B, MULC, and MUL_D that perform multiplication in $GF(2^8)$. In FIG. 2, GF multipliers 80 comprise top, bottom, and side inputs or ports. In the encryption direction, each GF multiplier 80 accepts input data at the top port, and key information at the side port. Multiplier 80 multiplies the input data by the key information, i.e., as two elements in $GF(2^8)$, and outputs the multiplication result at the bottom port. In the decrypt direction, the side port remains an input port for the key information, but the roles of the top and bottom ports are switched, i.e., the bottom port becomes an input port and the top port becomes an output port.

In the encryption direction, the key information to each of GF multipliers 80 comprises a respective 8-bit encryption sub-key denoted K1, K2, K3, or K4. Similarly, in the decryption direction the key information to each of GF multipliers 80 comprises a respective 8-bit decryption sub-key denoted INV_K1, INV_K2, INV_K3, or INV_K4. In the present example, the encryption and decryption 8-bit sub-keys are derived by splitting each respective 32-bit encryption and decryption key 74 and 78, into four 8-bit subsets of bits respectively. Additionally, each decryption sub-key represents the multiplicative inverse of a respective encryption sub-key. For example $INV\_K1=K1^{-1}$ in $GF(2^8)$ arithmetic. Note that the encryption and decryption sub-keys should be non-zero to prevent a zeroed GF multiplication product regardless of the data at the multiplier input.

We now describe the operation of cipher 70 in the encryption direction in detail. Plain text 72 is first split into two 8-bit sub-words denoted DH and DL. Multiplier MUL_A multiplies DH by K1 to produce an 8-bit result DH_K1, whereas MUL_B multiplies DL by K2 to produce an 8-bit result DL_K2. Cipher 70 then splits DH_K1 into two 4-bit sub-words denoted DH_K1_H and DH_K1_L, and also splits DL_K2 into 4-bit sub-words denoted DL_K2_H and DL_K2_L. Cipher 70 combines DH_K1_H with DL_K2_H, and DH_K1_L with DL_K2_L to produce respective 8-bit intermediate results INTERM_H and INTERM_L, which are input via the top port to MUL_C and MUL_D respectively.

GF multipliers MUL_C and MUL_D multiply their respective inputs INTERM_H and INTERM_L by respective sub-keys K3 and K4 to produce respective 8-bit outcomes EDH and EDL. Cipher 70 then combines EDH and EDL to derive 16-bit cipher text 76.

In the decryption direction, cipher 70 decrypts 16-bit cipher text 76 by reversing the operations carried out in the encryption direction. To this end, cipher 70 replaces splitting operations used for encryption with combining operations and vice versa. Additionally, in the decrypt direction, the top and bottom ports in each GF multiplier 80 serve as output and input ports respectively.

In the decryption direction, cipher 70 splits cipher text 76 into the two 8-bit sub-words EDH and EDL. GF multipliers MUL_C and MUL_D respectively multiply EDH by INV_K3 and EDL by INV_K4 to reproduce respective 8-bit intermediate results INTERM_H and INTERM_L. Cipher 70 then splits INTERM_H into the two 4-bit sub-words DH_K1_H and DL_K2_H, and INTERM_L into the 4-bit sub-words DH_K1_L and DL_K2_L. The four 4-bit sub-words are re-arranged and combined to produce 8-bit sub-words DH_K1 and DL_K2, which are then each multiplied by respective keys INV_K1 using MUL_A and by INV_K2 using MUL_B. Cipher then combines the 8-bit outputs of MUL_A (DH) and MUL_B (DL) to reproduce 16-bit plain text 72.

The configuration of cipher 70 above is an exemplary configuration, and other suitable configurations can also be used. For example, in FIG. 2, 16-bit words are split into 8-bit sub-words, which may further split into 4-bit sub-words. In alternative embodiments, cipher 70 may split words and sub-words in any other suitable bit size combinations, such as splitting a 16-bit word into 10 and 6 bits, and an 8-bit sub-word into 5 and 3 bits sub-words. In such alternative embodiments, the key should be split accordingly. Additionally, the bits within each split sub-word may be mixed in any suitable order. Note that with different splitting alternatives, the GF multipliers should be configured to accept the respective number of input bits and perform the multiplication accordingly. Additionally, in the decryption direction, combining bit sets should reverse the splitting operations and multiplication by the decryption sub-key should reverse the operation of multiplying by the encryption sub-key.

As another example, in FIG. 2, the architecture of cipher 70 comprises two levels of multiplication and splitting, wherein each level comprises two GF multipliers (e.g., a level comprising MUL_A and MUL_B, and another level comprising MUL_C and MUL_D). In alternative embodiments any other number of levels can also be used, such as for example, a third level of two GF multipliers with additional 8-bit sub-keys, or a single level comprising all four GF multipliers.

As yet another example, cipher 70 can use any suitable number of GF multipliers per level, other than two multipliers. For example, in the encrypt direction cipher 70 may split the 16-bit input plain text into four 4-bit sub-words, which are input to respective four GF multipliers at the first level.

Similar considerations apply for the key information. For example, in some embodiments, the sub-key may comprise a size other than 8 bits, with corresponding change to the key information inputs of the respective GF multipliers. Alternatively or additionally, instead of splitting the key into equal sized sub-keys, sub-keys of different sizes may be used, with corresponding changes to key information inputs of the respective GF multipliers, and splitting the data accordingly.

In some embodiments of the example cipher of FIG. 2, one or more of the GF multipliers may comprise different generating polynomials.

Figure 3:
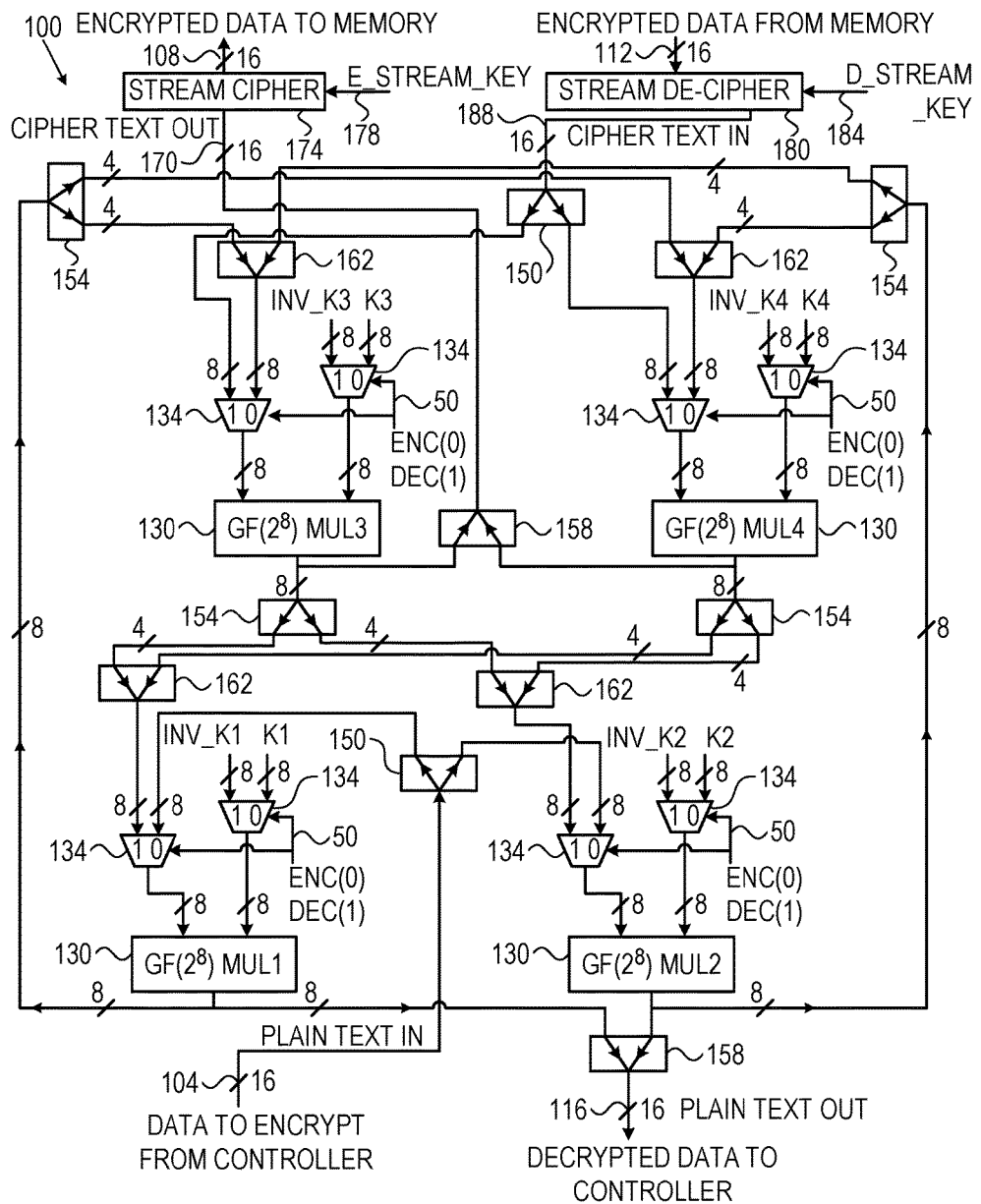
FIG. 3 is a block diagram of a hardware implementation of a cipher comprising multiple Galois-Field multipliers, in accordance with an embodiment of the present invention.
Figure 3:
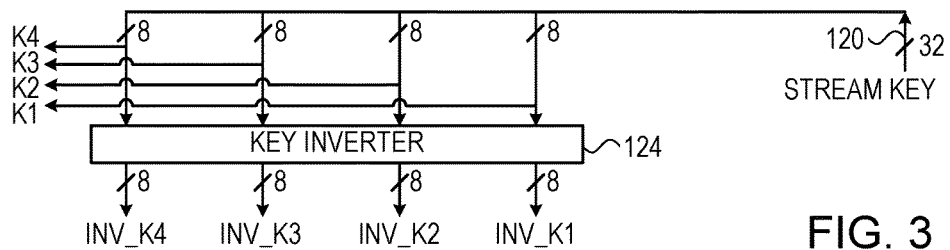

FIG. 3 is a block diagram of a hardware implementation of a cipher 100 comprising multiple Galois-Field multipliers, in accordance with an embodiment of the present invention. In the present example, cipher 100 implements cipher 40 in FIG. 1. The architecture of cipher 100 follows the design and data flow of cipher 70 described in FIG. 2. Cipher 100 can be configured to operate in each of the encryption or decryption modes.

In the encrypt direction, cipher 100 accepts 16-bit plain text 104 from controller 24 (e.g., from processor 32), and outputs 16-bit encrypted data 108 to be stored in external memory 28. In the decrypt direction, cipher 100 accepts 16-bit encrypted data 112 from memory 28 and outputs 16-bit plain text 116 to controller 24 (e.g., to processor 32).

Cipher 100 splits a 32-bit stream key 120 into four encryption sub-keys denoted K1, K2, K3 and K4. Stream key 120 can be identified with secret key 52 of FIG. 1, or with encryption key 74 of FIG. 2. A Key inverter unit 124 derives decryption sub-keys denoted INV_K1, INV_K2, INV_K3, and INV_K4. Each decryption sub-key represents the multiplicative inverse of a respective encryption sub-key (e.g., INV_K1=K1$^{-1}$).

Cipher 100 comprises four GF($2^8$) multipliers 130 denoted MUL1 . . . MUL4 whose functionality is similar to the functionality of respective GF multipliers MUL_A . . . MUL_D in FIG. 2. Each multiplier 130 comprises two top inputs or ports and one output bottom port. Multiplier 130 accepts an 8-bit input data at the top left port and 8-bit of key information at the top right port, and outputs the GF multiplication result at the bottom port. Each of the top ports of multiplier 130 accepts an input from a respective multiplexer 134, which selects which of its two inputs to deliver to the respective multiplier port according to the level of select line 50. For example, at the top right port of MUL1, in the encryption direction, MUL1 accepts K1 and in the decryption direction MUL1 accepts INV_K1.

Cipher 70 further comprises two splitters 150, each is configured to split a 16-bit word into two 8-bit sub-words, and four splitters 154, each is configured to split an 8-bit sub-word into two 4-bit sub-words. Cipher additionally comprises two combiners 158, each is configured to combine two 8-bit sub-words into a single 16-bit word, and four combiners 162, each is configured to combine two 4-bit sub-words into a single 8-bit sub-word.

In the encryption direction, MUL1 and MUL2 calculate DH_K1_H=DH*K1, and DL_K2=DL*K2, respectively, similarly to MUL_A and MUL_B in FIG. 2. The operator '*' denotes multiplication in GF($2^8$). Additionally, MUL3 and MUL4 calculate INTERIM_H*K3 and INTERIM_L*K4, similarly to MUL_C and MUL_D, respectively.

In the decryption direction, MUL3 and MUL4 calculate EDH*INV_K3 and EDL*INV_K4, respectively, similarly to MUL_C and MUL_D (of FIG. 2). In addition, MUL1 and MUL2 calculate DH=DH_K1*INV_K1 and DL=DL_K2*INV_K2 respectively, similarly to respective multipliers MUL_A and MUL_B. Table 1 below summarizes the calculations performed by each of GF multipliers 130 as related to both FIGS. 2 and 3.

TABLE 1

| FIG. 2 | FIG. 3 | Encryption | Decryption |
|---|---|---|---|
| MUL_A | MUL1 | DH_K1 = DH*K1 | DH = DH_K1*INV_K1 |
| MUL_B | MUL2 | DL_K2 = DL*K2 | DL = DL_K2*INV_K2 |
| MUL_C | MUL3 | EHD = INTERM_H*K3 | INTERM_H = EDH*INV_K3 |
| MUL_D | MUL4 | EDL = INTERM_L*K4 | INTERM_L = EDL*INV_K4 |

Consider now a case in which plain text 104 comprises a zero word (i.e., all the 16 bits of the plain text equal '0'). Since multiplication by zero (using GF multipliers 130) results in zero output, and since splitting and combining bits (by splitters 150 and 154, and combiners 158 and 162) do not alter zero bits, cipher text output 170 would result in a 16-bit zero word. Cipher text output 170 in FIG. 3 is equivalent to cipher text 76 in FIG. 2 above. To avoid such predictable output, cipher 100 further comprises a stream cipher 174, which randomizes its input using a stream key 178 denoted E_STREAM_KEY. The output of stream cipher 174 comprises the encrypted data 108 to be sent for storage on external memory 28.

When reading encrypted data 112 from memory 28, the operation of stream cipher 174 (i.e., performed during encryption) is reversed by applying a respective stream de-cipher 180 and a key 184 denoted D_STREAM_KEY. De-cipher 180 outputs CIPHER_TEXT_IN 188, which is equivalent to cipher text data 76 in FIG. 2 when cipher 70 operates in the decrypt direction.

Cipher 100 can use any suitable method for generating the stream keys E_STREAM_KEY and D_STREAM_KEY as known in the art. When retrieving data stored at a given address location in the external memory, D_STREAM_KEY should equal the value of E_STREAM_KEY that was used to encrypt that data.

Figure 4:
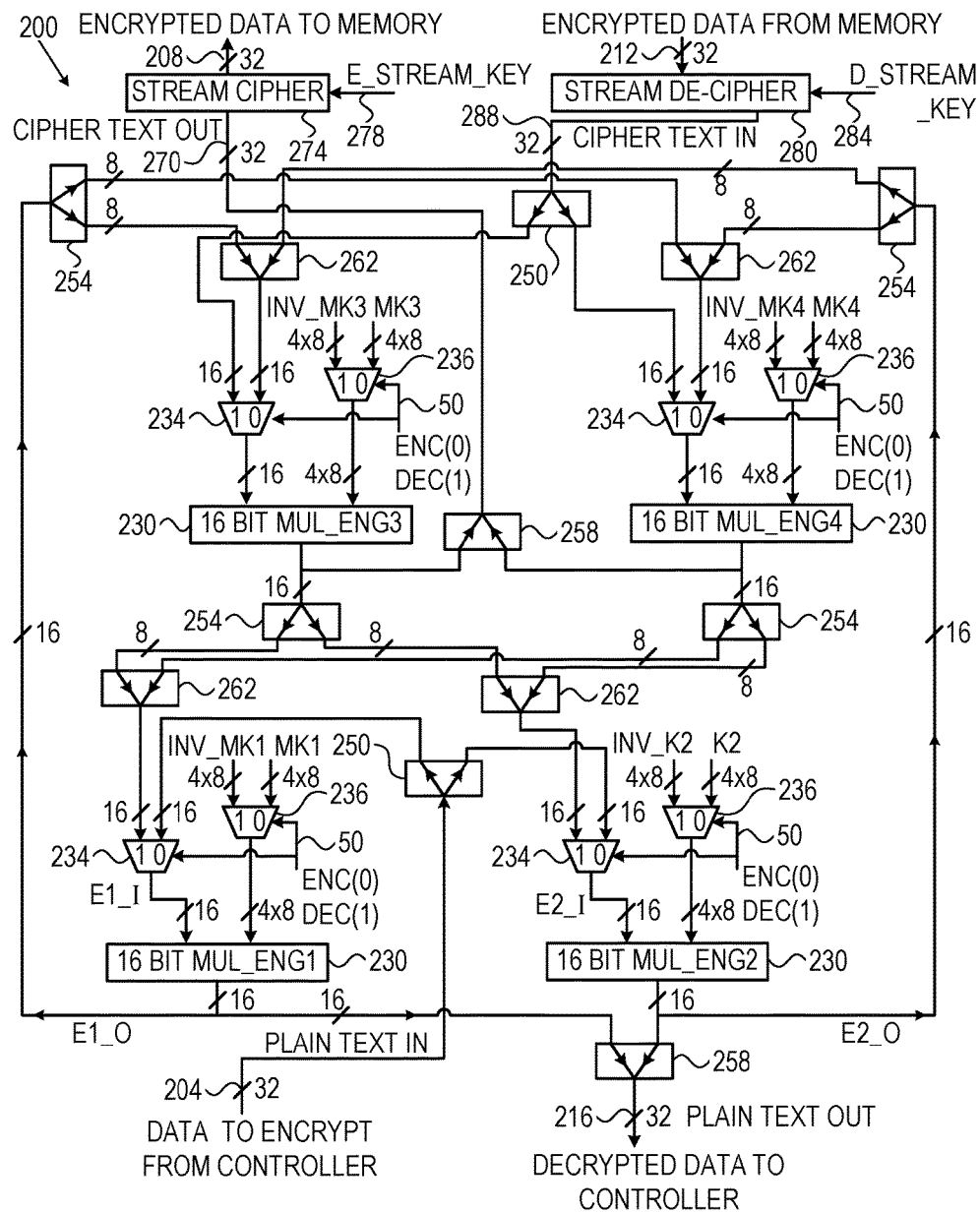
FIG. 4 is a block diagram of a hardware implementation of a block cipher comprising multiple Galois-Field multiplication engines, in accordance with an embodiment of the present invention.

FIG. 4 is a block diagram of a hardware implementation of a cipher 200 using multiple Galois-Field multiplication engines, in accordance with another embodiment of the present invention. Cipher 200 of FIG. 4 supports the encryption and decryption of 32-bit data blocks, and uses the complete cipher 100 of FIG. 3 as a multiplication engine. Cipher 200 can be used as cipher 40 in system 20 of FIG. 1 above.

The general architecture and data flow within cipher 200 of FIG. 4 and cipher 100 of FIG. 3 are similar. The differences between ciphers 200 and 100 relate to the different sizes of the supported plain and cipher texts. Cipher 200 handles 32-bit plain and cipher text words whereas cipher 100 supports plain and cipher text words of 16 bits. As a result, elements of cipher 100 such as splitters 150 and 154, combiners 158 and 162, and key inverter module 124 are configured accordingly in cipher 200. In addition, instead of GF multipliers 130 of cipher 100, cipher 200 comprises multiplication engines 230 as described below.

As an example, cipher 100 performs encryption and decryption by applying 32-bit keys, which are split into 8-bit sub-keys, but the encryption and decryption keys applied by cipher 200 comprise 128 bits, which are each split into a 4×8=32 bit sub-key.

In the encrypt direction of FIG. 4, cipher 200 accepts 32-bit plain text 204 from controller 24 (e.g., from processor 32), and outputs 32-bit encrypted data 208 to be stored in external memory 28. In the decrypt direction, cipher 200 accepts 32-bit encrypted data 212 from memory 28 and outputs 32-bit plain text 216 to controller 24 (e.g., to processor 32).

Table 2 below summarizes the relationships between corresponding elements of ciphers 100 and 200.

TABLE 2

| Element | in FIG. 3 | in FIG. 4 |
|---|---|---|
| Input data to encrypt | (104) 16-bit | (204) 32-bit |
| Output encrypted data | (108) 16-bit | (208) 32-bit |
| Input data to decrypt | (112) 16-bit | (212) 32-bit |
| Output decrypted data | (116) 16-bit | (216) 32-bit |
| Stream key | (120) 32-bit | (220) 128-bit |
| Encryption sub-keys | K1 . . . K4 8-bit | MK1 . . . MK4 4 × 8-bit |
| Decryption sub-keys | INV_K1 . . . INV_K4 8-bit | INV_MK1 . . . INV_MK4 4 × 8-bits |
| Multiplication unit | (130) GF multiplier | (230) GF multiplication engine |
| Multiplxer | (134) 8-bit DATA and KEY | (234) 16-bit DATA (236) 32-bit KEY |
| Splitter | (150) 16->2 × 8 bit | (250) 32->2 × 16 bit |
| Splitter | (154) 8->2 × 4 bit | (254) 16->2 × 8 bit |

TABLE 2-continued

| Element | in FIG. 3 | in FIG. 4 |
|---|---|---|
| Combiner | (158) 2 × 8->16 bit | (258) 2 × 16->32 bit |
| Combiner | (162) 2 × 4->8 bit | (262) 2 × 8->16 bit |
| Stream cipher | (174) 16-bit | (274) 32-bit |
| E_STREAM_KEY | (178) | (278) |
| Stream de-cipher | (180) 16-bit | (280) 32-bit |
| D_STREAM_KEY | (184) | (284) |

The configurations of cipher 100 and 200 in FIGS. 3 and 4 above are exemplary configurations, and other suitable configurations can also be used. Arguments regarding other suitable configurations are similar to those given for cipher 70 above.

In some embodiments of cipher 200, stream cipher 274, stream de-cipher 280 and corresponding keys 278 and 284 may be omitted.

Authentication Based on GF Multiplication

Figure 5:
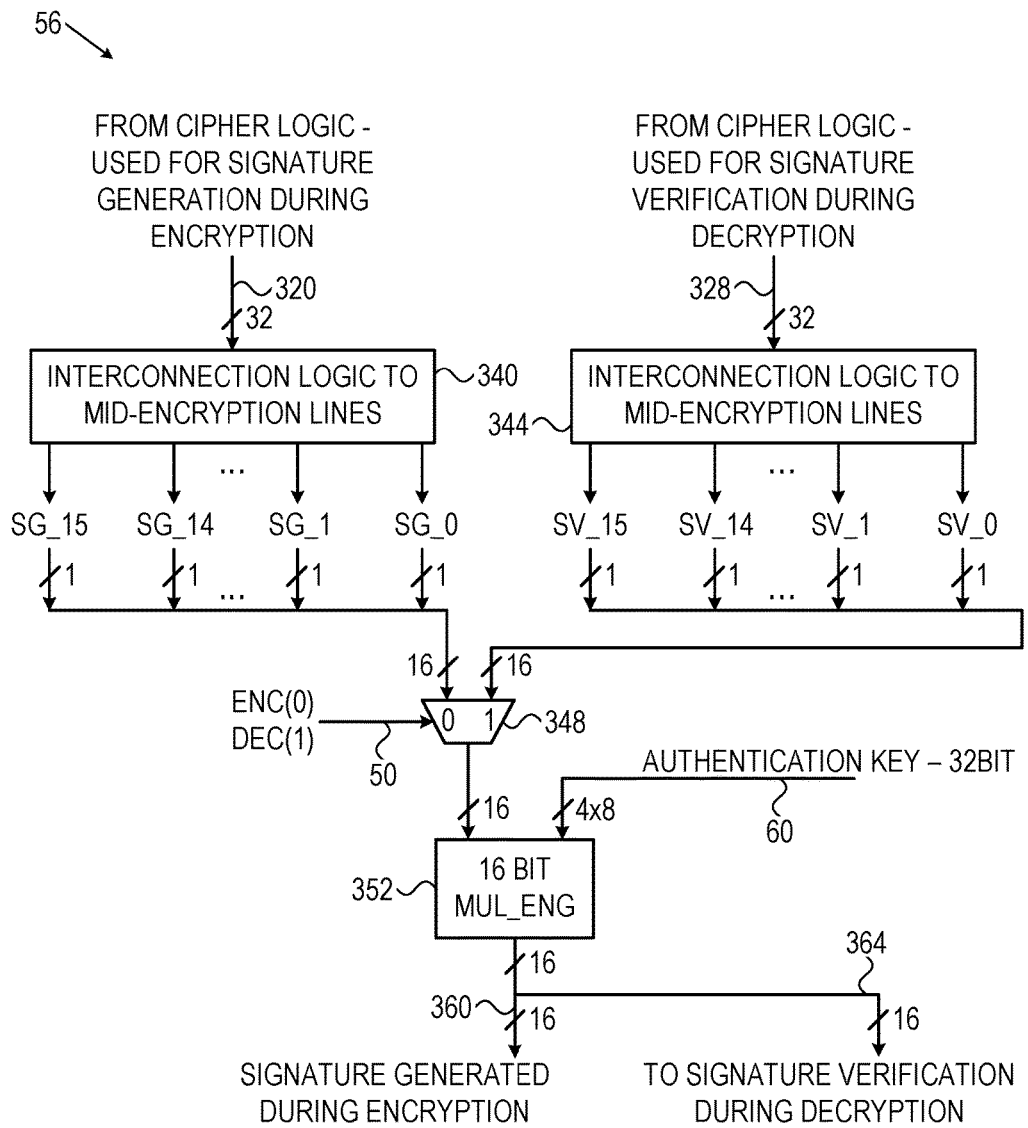
FIG. 5 is a block diagram of an authentication unit whose signature calculations are based on Galois-Field multiplication, in accordance with an embodiment of the present invention.

FIG. 5 is a block diagram of authentication unit 56, whose signature calculations are based on Galois-Field multiplication, in accordance with an embodiment of the present invention. In the present example, authentication unit 56 is designed to operate in conjunction with cipher 200. As described in FIG. 1 above, authentication unit 56 accepts from cipher 200 data for authentication over authentication bus 58. In FIG. 5, 32-bit inputs 320 and 328 represent the input direction of bus 58 toward unit during the encryption and decryption operations of cipher 200, respectively.

At cipher 200, input lines 320 connect to the lines denoted E1_O and E2_O (16-bit each) at the outputs of multiplication engines MUL_ENG1 and MUL_ENG2, respectively. At authentication unit 56, lines 320 connect to interconnection logic 340, which applies logical operations on its inputs and outputs sixteen 1-bit lines denoted SG_0 . . . SG_15. Logic 340 can apply any suitable logical operations to its inputs. In an example embodiment, logic 340 applies logical XORs to its inputs ordered in pairs, as summarized in Table 3.

TABLE 3

| SG_15 | XOR (E2_O [1], E1_O [0]) |
| SG_14 | XOR (E2_O [3], E1_O [2]) |
| SG_13 | XOR (E2_O [5], E1_O [4]) |
| SG_12 | XOR (E2_O [7], E1_O [6]) |
| SG_11 | XOR (E2_O [9], E1_O [8]) |
| SG_10 | XOR (E2_O [11], E1_O [10]) |
| SG_9 | XOR (E2_O [13], E1_O [12]) |
| SG_8 | XOR (E2_O [15], E1_O [14]) |
| SG_7 | XOR (E2_O [0], E1_O [1]) |
| SG_6 | XOR (E2_O [2], E1_O [3]) |
| SG_5 | XOR (E2_O [4], E1_O [5]) |
| SG_4 | XOR (E2_O [6], E1_O [7]) |
| SG_3 | XOR (E2_O [8], E1_O [9]) |
| SG_2 | XOR (E2_O [10], E1_O [11]) |
| SG_1 | XOR (E2_O [12], E1_O [13]) |
| SG_0 | XOR (E2_O [14], E1_O [15]) |

The mapping configuration in Table 3 is exemplary, and any other suitable mapping can also be used. For example, any of the output bits SG_0 . . . SG_15 can be derived by combining (e.g., using logical XOR, or any other suitable logical operation) any subset of one or more of the 32 input bits. For example, interconnection logic 340 can combine 3 or 4 input bits to derive a single output bit.

Alternatively or additionally, the subsets of the input bits from which interconnection logic 340 derives each output bit may differ in size. For example, some of the SG0 . . . SG15 outputs can be each mapped to a single input bit, whereas other output bits can be derived by combining multiple input bits, such as, for example a five input bits to a single output bit mapping. As yet another example, mapping a subset of the input bits into multiple output bits, such as mapping three input bits to two output bits, is also possible.

At the cipher side, lines 328 of unit 56 connect to the lines denoted E1_I and E2_I (16-bit each) at the inputs to respective multiplexers 234 whose outputs connect to multiplication engines MUL_ENG1 and MUL_ENG2, respectively. At authentication unit 56, lines 328 connect to interconnection logic 344, which applies logical operations to its inputs, and outputs sixteen 1-bit lines denoted SV_0 . . . SV_15. Logic 344 can apply any suitable logical operations to its inputs. In an example embodiment, logic 344 applies logical XORs to its inputs ordered in pairs, as summarized in Table 4. Similarly to interconnection logic 340, in alternative embodiments of interconnection logic 344, other mapping methods, such as, for example, those described above, can also be used.

TABLE 4

| SV_15 | XOR (E2_I [1], E1_I [0]) |
| SV_14 | XOR (E2_I [3], E1_I [2]) |
| SV_13 | XOR (E2_I [5], E1_I [4]) |
| SV_12 | XOR (E2_I [7], E1_I [6]) |
| SV_11 | XOR (E2_I [9], E1_I [8]) |
| SV_10 | XOR (E2_I [11], E1_I [10]) |
| SV_9 | XOR (E2_I [13], E1_I [12]) |
| SV_8 | XOR (E2_I [15], E1_I [14]) |
| SV_7 | XOR (E2_I [0], E1_I [1]) |
| SV_6 | XOR (E2_I [2], E1_I [3]) |
| SV_5 | XOR (E2_I [4], E1_I [5]) |
| SV_4 | XOR (E2_I [6], E1_I [7]) |
| SV_3 | XOR (E2_I [8], E1_I [9]) |
| SV_2 | XOR (E2_I [10], E1_I [11]) |
| SV_1 | XOR (E2_I [12], E1_I [13]) |
| SV_0 | XOR (E2_I [14], E1_I [15]) |

Under the control of select line 50 (whose level may be determined by processor 32), multiplexer 348 selects which of its two 16-bit inputs SG_0 . . . SG_15 or SV_0 . . . SV_15 to deliver to multiplication engine 352. In the present example, multiplication engine 352 is similar to multiplication engine 230 used in cipher 200. Engine 352 accepts at its key information input 32-bit authentication key 60, and outputs a 16-bit signature.

In the encryption direction, engine 352 multiplies key 60 by SG_0 . . . SG15 to generate a 16-bit signature 360. In the decryption direction, engine 352 multiplies key 60 by SV_0 . . . SV_15 to calculate a signature 364 to be used for verification. Note that when reading authentic data from memory 28, SV_0 . . . SV_15 equals SG_0 . . . SG_15 that was used for deriving the respective stored signature, and therefore the read data is validated to be authentic when signature 364 equals the respective stored signature.

The configuration of authentication unit 56 in FIG. 5 above is an exemplary configuration, and other suitable configurations can also be used. For example, in alternative embodiments, 32-bit inputs 320 and 328 can connect to other points in cipher 200, such as, for example, PLAIN TEXT IN 204, and CIPHER TEXT IN 288, respectively. Also, unit 56 may comprise any other suitable multiplication engine 352, such as, for example a 16-bit GF multiplier, as well as any other suitable sizes for the authentication key and signature. Additionally, authentication unit 56, can be configured to operate in conjunction with cipher 100 or with any other suitable cipher. Although in FIG. 5 unit 56 is configured to calculate and to validate a 16-bit signature, in alternative embodiments the described scheme can be changed to support any other suitable signature size.

Architecture for Combined Ciphering and Authentication

Figure 6:
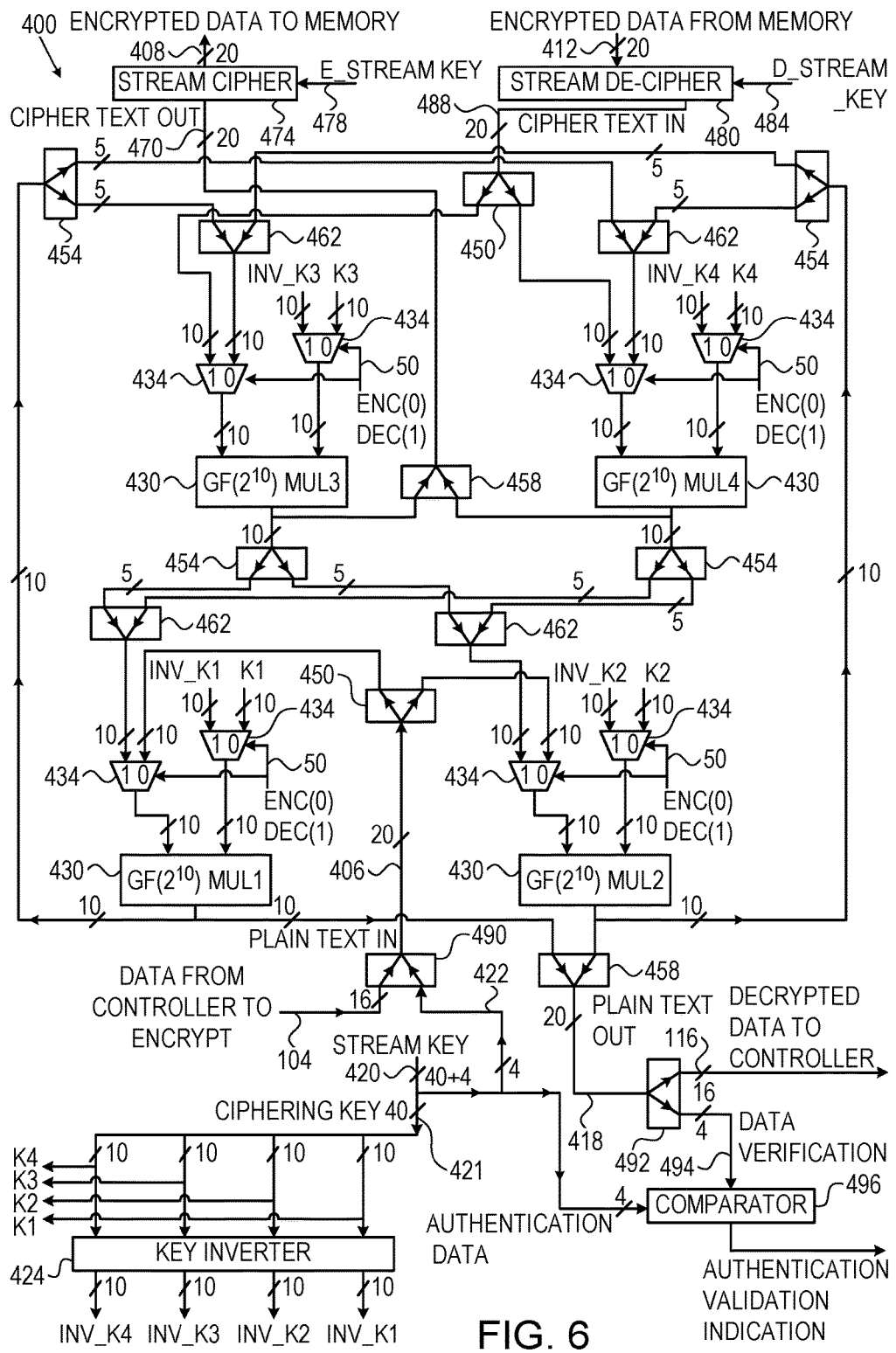
FIG. 6 is a block diagram of a hardware implementation of a security system that combines ciphering and authentication, in accordance with an embodiment of the present invention.

FIG. 6 is a block diagram of a hardware implementation of a security system 400 that combines ciphering and authentication, in accordance with an embodiment of the present invention. The architecture of system 400 and the data flow during ciphering are similar to those described in cipher 100 of FIG. 3 above.

System 400 combines the functionalities of ciphering and authentication by encrypting plain text that includes both input data to be encrypted, and authentication data that is used for authentication. In the decryption direction, the stored encrypted data is read and decrypted to recover the input data and the authentication data. The recovered authentication data is compared to the authentication data that was used in the encryption direction, to validate that the recovered input data is authentic.

Ciphering in system 400 is based on multiple $GF(2^{10})$ multipliers 430 that each multiplies a 10-bit input by a 10-bit sub-key to produce a 10-bit product. Consequently, a stream key 420 comprises 44 bits, of which 40 bits comprise ciphering key 421, and 4 bits serve as authentication data 422. In system 400, 10-bit encryption keys K1 ... K4 are split from ciphering key 421. Key inverter 424 inverts each of the keys K1 ... K4 to derive a respective 10-bit inverted key INV_K1 ... INV_K4. Key inverter 424 can use inversion tables of $10 \cdot 2^{10}$ bits in size.

Since in FIG. 6 10-bit input GF multipliers replace the 8-bit input GF multipliers of FIG. 3, other component change as well. For example, the 8-bit input splitters 154 in FIG. 3 and 4-bit input combiners 162 are replaced in FIG. 6 with 10-bit input splitters 454 and 5-bit input combiners 462, respectively. As another example, 8-bit multiplexers 134 in FIG. 3 are replaced with 10-bit multiplexers 434 in FIG. 6.

Since during encryption and decryption the data flow in FIG. 6 is similar to the data flow described in FIG. 3 above, the data flow details are now omitted.

In the encryption direction, a combiner unit 490 combines 16-bit data 104 with 4-bit authentication data 422 to produce a 20-bit plain text input 406. System 400 encrypts plain text 406 using GF multipliers MUL1 ... MUL4, to produce cipher text out 470. System 400 applies stream cipher 474 to cipher text 470, and sends 20-bit encrypted data 408 for storage in the external memory.

In the decryption direction, system 400 retrieves from the memory 20-bit encrypted data 412 and applies stream deciphering using de-cipher 480 to recover cipher text input 488. System 400 decrypts cipher text 488 using MUL1 ... MUL4 and recovers a 20-bit plain text output 418. A 20-bit splitter 492 splits plain text 418 to recover 16-bit decrypted data 116, and 4-bit verification data 494. A comparator 496 accepts authentication data 422 and verification data 494 as inputs. Comparator 496 indicates that decrypted data 116 is authentic when the two 4-bit inputs match, and that decrypted data 116 may have been tampered with, otherwise.

The security system configuration described in FIG. 6 is exemplary and other suitable configurations can also be used. For example, in alternative security systems, GF multipliers other than 10-bit input multipliers can also be used (with respective modifications to other components).

Although the combined encryption and authentication architecture in FIG. 6 uses GF multipliers, an alternative security system can comprise a similar architecture and use multiplication engines, such as, for example, engines 230 instead of GF multipliers 130. Similarly to the embodiments described above, system 400 can also use configurations other than described in FIG. 6 for bit splitting, bit combining, and bit mixing.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A cryptography apparatus, comprising:
   multiple multiplication units, which are arranged in two or more multiplication levels, and which are configured to operate in accordance with Galois-Field (GF) arithmetic over respective Galois fields; and
   logic circuitry, which is configured to:
      receive input data comprising plain text data or cipher text data, which is associated with a memory address of an external memory and whose word-size exceeds a maximal input word-size among the multiplication units;
      generate multiple first sub-keys whose number does not exceed a number of the multiplication units;
      generate multiple second sub-keys, by calculating for each of the multiple first sub-keys a respective multiplicative inverse, in accordance with the Galois Field of a respective multiplication unit;
      provide data blocks derived from the input data, and the multiple first or second sub-keys, to the respective multiplication units; and
      perform a first cryptographic operation when the input data comprises plain text data or a second cryptographic operation when the input data comprises cipher text data, on the input data, by respectively applying the multiplication units to the data blocks and to the first or second sub-keys.

2. The apparatus according to claim 1, wherein the received input data comprises plain text data, wherein the multiple first sub-keys comprise an encryption key, and wherein the first cryptographic operation comprises an encryption operation to be applied to the plain text data using the multiple first sub-keys.

3. The apparatus according to claim 1, wherein the logic circuitry is configured to alternate between first and second modes of using the multiplication units, such that:
   in the first mode, the input data comprises plain text data, the multiple first sub-keys comprise an encryption key, and the first cryptographic operation comprises an encryption operation applied to the plain text data using the multiple first sub-keys; and
   in the second mode, the input data comprises cipher text data, the multiple second sub-keys comprise a decryption key, and the second cryptographic operation comprises a decryption operation applied to the cipher text data using the multiple second sub-keys.

4. The apparatus according to claim 1, wherein the input data comprises cipher text data, wherein the multiple second sub-keys comprise a decryption key, and wherein the second cryptographic operation comprises a decryption operation applied to the cipher text data using the multiple second sub-keys.

5. The apparatus according to claim 4, wherein the multiple second sub-keys comprise multiple decryption sub-keys, and wherein the logic circuitry is configured to derive the multiple decryption sub-keys from multiple respective encryption sub-keys that were used for producing the cipher text data.

6. The apparatus according to claim 5, wherein the logic circuitry is configured to derive each of the multiple decryption sub-keys by applying a Galois-Field (GF) inversion operation to each respective encryption sub-key.

7. The apparatus according to claim 1, wherein the logic circuitry is configured to feed inputs to the multiplication units in a given multiplication level by manipulating the input data or the outputs of the multiplication units of a previous multiplication level by performing at least one operation selected from a group of operations consisting of bit-splitting, bit-combining, and bit mixing.

8. The apparatus according to claim 7, wherein the logic circuitry is configured to manipulate the outputs of the multiplication units during decryption operations in reverse order with respect to an order used during encryption operations.

9. The apparatus according to claim 1, wherein the first and second cryptographic operations comprise respective first and second authentication operations applied respectively to the plain text data or to the cipher text data using at least the multiple first sub-keys or the multiple second-sub-keys.

10. The apparatus according to claim 9, wherein the logic circuitry is configured to authenticate the cipher text data by comparing between a second signature calculated using the second authentication operation from second data that is derived from the cipher text data during decryption, and a first signature calculated using the first authentication operation from first data that is derived from the plain text during encryption, wherein when the first and second signatures are equal to one another, the cipher text is considered authentic with high probability.

11. The apparatus according to claim 10, wherein the logic circuitry is configured to calculate the first signature and the second signature by processing each of the first data and second data with an authentication key, using a multiplication unit.

12. The apparatus according to claim 10, wherein the plain text data comprises input text and input authentication data, and the cipher text data comprises output text and output authentication data, and wherein the logic circuitry is configured to authenticate the cipher text data by comparing the input and output authentication data.

13. A method for cryptography, comprising:
receiving input data comprising plain text data or cipher text data, which is associated with a memory address of an external memory and whose word-size exceeds a maximal input word-size among multiple multiplication units, which are arranged in two or more multiplication levels, and which are configured to operate in accordance with Galois-Field (GF) arithmetic over respective Galois fields;

generating multiple first sub-keys whose number does not exceed a number of the multiplication units;
generating multiple second sub-keys, by calculating for each of the multiple first sub-keys a respective multiplicative inverse, in accordance with the Galois Field of a respective multiplication unit;
providing data blocks derived from the input data, and the multiple first or second sub-keys, to the respective multiplication units; and
performing a first cryptographic operation when the input data comprises plain text data or a second cryptographic operation when the input data comprises cipher text data, on the input data, by respectively applying the multiplication units to the data blocks and to the first or second sub-keys.

14. The method according to claim 13, wherein receiving the input data comprises receiving plain text data, wherein the multiple first sub-keys comprise an encryption key, and wherein performing the first cryptographic operation comprises encrypting the plain text data using the multiple first sub-keys.

15. The method according to claim 13, wherein performing the first and second cryptographic operations comprises alternating between first and second modes of using the multiplication units, such that:
in the first mode, the input data comprises plain text data, the multiple first sub-keys comprise an encryption key, and the first cryptographic operation comprises an encryption operation applied to the plain text data using the multiple first sub-keys; and
in the second mode, the input data comprises cipher text data, the multiple second sub-keys comprise a decryption key, and the second cryptographic operation comprises a decryption operation applied to the cipher text data using the multiple second sub-keys.

16. The method according to claim 13, wherein receiving the input data comprises receiving cipher text data, wherein the multiple second sub-keys comprise a decryption key, and wherein performing the second cryptographic operation comprises decrypting the cipher text data using the multiple second sub-keys.

17. The method according to claim 16, wherein the multiple second sub-keys comprise multiple decryption sub-keys, and further comprises deriving the multiple decryption sub-keys from multiple respective encryption sub-keys that were used for producing the cipher text data.

18. The method according to claim 17, wherein deriving the decryption sub-keys comprises deriving each of the multiple decryption sub-keys by applying a Galois-Field (GF) inversion operation to each respective encryption sub-key.

19. The method according to claim 13, wherein performing the first and second cryptographic operations comprises feeding inputs to the multiplication units in a given multiplication level by manipulating the input data or outputs of the multiplication units of a previous multiplication level by performing at least one operation selected from a group of operations consisting of bit-splitting, bit-combining, and bit mixing.

20. The method according to claim 19, wherein manipulating the input data or the outputs of the multiplication units comprises manipulating the input data or the outputs during decryption operations in reverse order with respect to an order used during encryption operations.

21. The method according to claim 13, wherein performing the first and second cryptographic operations comprises performing respective first and second authentication operations applied to the plain text data or to the cipher text data using at least the multiple first sub-keys or the multiple second sub-keys.

22. The method according to claim 21, wherein performing the first and second authentication operations comprises authenticating the cipher text data by comparing between a second signature calculated using the second authentication operation from second data that is derived from the cipher text data during decryption and a first signature calculated using the first authentication operation from first data that is derived from the plain text data during encryption, wherein if the first and second signatures are equal to one another, then the cipher text is considered authentic with high probability.

23. The method according to claim 22, wherein calculating the first signature and the second signature comprises processing each of the first data and second data with an authentication key using a multiplication unit.

24. The method according to claim 22, wherein the plain text data comprises input text and input authentication data, and the cipher text data comprises output text and output authentication data, and wherein authenticating the cipher text data comprises comparing between the input and output authentication data.

25. A computing system, comprising:
an external memory; and
a controller, which comprises multiple multiplication units, which are arranged in two or more multiplication levels, and which are configured to operate in accordance with Galois-Field (GF) arithmetic over respective Galois fields, wherein the controller is configured to:
receive input data comprising plain text data or cipher text data, which is associated with a memory address of the external memory and whose word-size exceeds a maximal input word-size among the multiplication units;
generate multiple first sub-keys whose number does not exceed a number of the multiplication units;
generate multiple second sub-keys, by calculating for each of the multiple first sub-keys a respective multiplicative inverse, in accordance with the Galois Field of a respective multiplication unit;
provide data blocks derived from the input data, and the multiple first or second sub-keys, to the respective multiplication units; and
perform the first cryptographic operation when the input data comprises plain text data or a second cryptographic operation when the input data comprises cipher text data, on the input data, by respectively applying the multiplication units to the data blocks and to the first or second sub-keys.

* * * * *